Oct. 23, 1951   G. W. LUNING   2,572,361
LATHE CROSS-FEED INDICATING DIAL
Filed May 16, 1949   2 SHEETS—SHEET 1

INVENTOR.
GEORGE W. LUNING
BY
Willard S. Grover
ATTORNEY.

Oct. 23, 1951     G. W. LUNING     2,572,361
LATHE CROSS-FEED INDICATING DIAL
Filed May 16, 1949     2 SHEETS—SHEET 2

INVENTOR.
GEORGE W. LUNING
BY
ATTORNEY.

Patented Oct. 23, 1951

2,572,361

UNITED STATES PATENT OFFICE 2,572,361

LATHE CROSS-FEED INDICATING DIAL

George W. Luning, Cincinnati, Ohio, assignor to The R. K. Le Blond Machine Tool Company, Cincinnati, Ohio, a corporation of Delaware Application May 16, 1949, Serial No. 93,553

5 Claims. (Cl. 116—115.5)

This invention pertains to an improved indicating dial for a machine tool. More particularly this invention pertains to an improved differential or dual-dial indicating mechanism for the positioning of a machine tool member.

One of the objects of this invention is to provide an improved cross feed dial for a lathe which may be utilized for accurately and quickly setting the cutting tool of the lathe to proper depth of cut with a minimum of effort and error on the part of the operator.

Another object of this invention is to provide an improved system of graduations for a multi-dial indicating mechanism having differentially moving graduated dial members arranged so as to provide a direct reading device for accurately successively positioning a cross slide for predetermined depths of cut of the tool.

Further features and advantages of this invention will appear from the following detailed description of the drawings in which.

Figure 2:
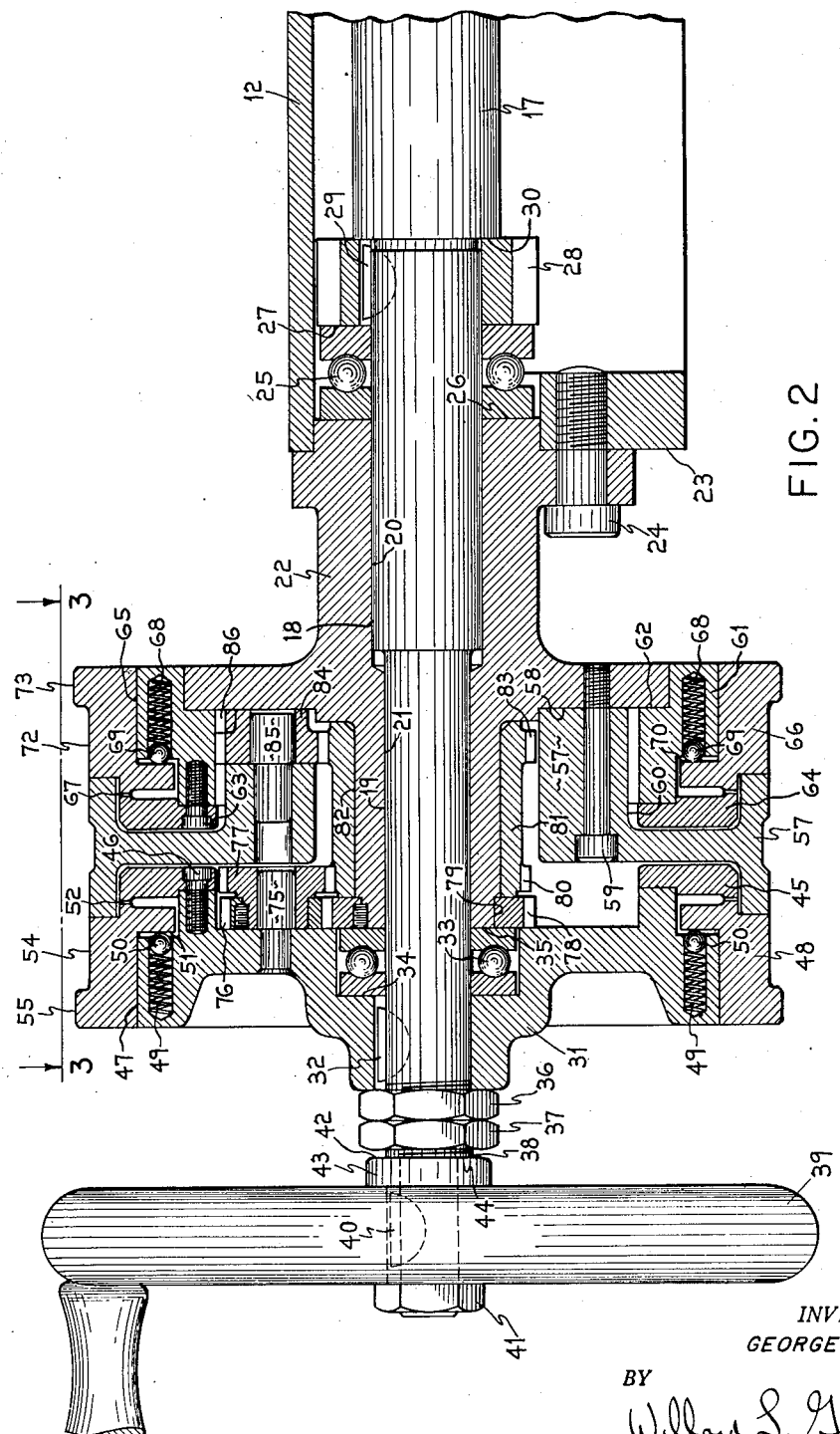
Figure 2 is an enlarged diametrical sectional view of the dial mechanism on the line 2—2 of Figure 1.

For exemplary purposes this invention is shown applied to a lathe in which there is a bed 10 having the slide ways 11 upon which is mounted the usual carriage 12 supporting the cross slide 13 which in turn supports the tool holder 14 and cutting tool 15. On the cross slide 13 is fixed the usual cross feed nut 16 in which operates the cross feed screw 17. The cross feed screw has reduced bearing portions 18 and 19, Figure 2, which are respectively journaled in the bearing bores 20 and 21 in the bracket 22 fixed to the outer face 23 of the carriage by the screws 24. Axial displacement of the screw is restricted by the thrust bearing 25 which abuts against the face 26 of the bracket 22 and against the face 27 of the gear 28. The gear 28 is keyed at 29 to drive the cross feed screw from the usual apron gearing and in turn abuts against the face 30 of the screw. On the cross feed screw 17 is slidably mounted the plate member 31 arranged to be driven by rotation of the screw through the key 32. A thrust bearing 33 is interposed between the face 34 on the plate member 31 and the end face 35 of the bracket 22. Adjusting and lock nuts 36 and 37 are threadedly mounted on the cross feed screw at 38 and may be set to provide the proper running clearance between the thrust bearings 25 and 33. On the outer end of the cross feed screw is fixed the usual operating hand wheel 39 by means of the key 40 and nut 41 which draws the face 42 of the hub 43 of the hand wheel securely up against the face 44 of the cross feed screw.

Figures 1, 3:
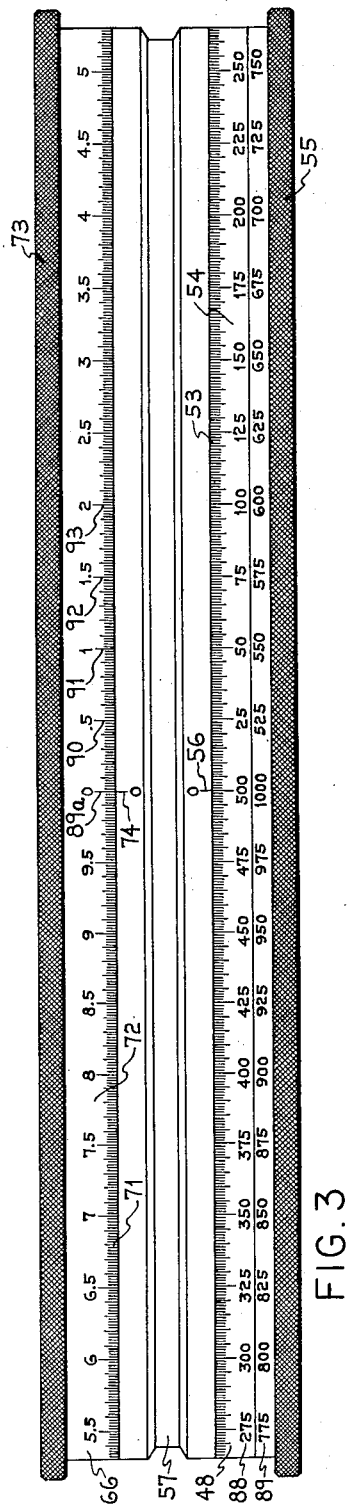
Figure 1 is a fragmentary right hand end view of a lathe showing the dial indicating mechanism applied to the cross feed mechanism.
Figure 3 is a fragmentary diagrammatic view of the periphery of the graduated collars of the dial indicating mechanism.

On the plate member 31 is fixed the clutch ring 45 by suitable screws 46 and journaled on the outside diameter portion 47 of the plate member 31 is the "thousandths" graduated collar or indicating dial 48 which is urged toward the clutch ring 45 by the springs 49 engaging the balls 50 which in turn engage the face 51 of the graduated collar 48. Mating fine tooth clutch teeth are provided at 52 on the clutch ring 45 and the graduated collar 48 having a pitch or spacing equal to the spacing between each of the graduations 53 on the periphery 54 of the collar. A suitable raised knurled portion 55 is formed on the graduated collar 48 so that the operator may grasp the collar and move it axially, to the left in Figure 2, to disengage the clutch teeth at 52 and then rotate the dial relative to the cross feed screw and the zero indicating line 56, Figure 3.

The zero indicating line 56 is carried on the ring member 57 which is secured to the face 58 of the bracket 22 by suitable screws 59. Journaled on the bearing surface 60 on the member 57 is the internal gear ring 61 having an abutment face 62 engaging the face 58 of the bracket 22. Fixed to the ring 61 by suitable screws 63 is the clutch ring 64. Journaled on the peripheral bearing surface 65 of the ring member 61 is the "inches" indicating graduated collar or indicating dial 66 having mating clutch teeth at 67 with the clutch ring member 64. Springs 68 acting on the balls 69 which engage the face 70 of the collar 66 serve to urge the clutch teeth in engagement at 67. The pitch or spacing of the teeth at 67 is arranged to agree with the spacing of the graduations 71 formed on the periphery 72 of the graduated collar 66. A raised knurled portion 73 is provided on the collar 66 so that the operator may move the collar axially, to the right in Figure 2, to re-position the collar relative to the clutch ring 64 and the zero indicating mark 74 on the member 57.

The "inches" indicating graduated collar 66 is rotated at a differentially slower rate than the "thousandths" graduated collar 48. To the plate member 31 is fixed the planet gear stud 75 upon which is journaled the compound planet gear comprising the smaller gear 76 and the larger gear 77, both rigidly connected to rotate together. The smaller gear 76 engages the stationary gear 78 suitably fixed to the reduced end portion 79 of the bracket 22. The larger gear 77 engages the gear 80 formed on the sleeve 81 journaled on the bearing portion 82 of the bracket 22. On the other end of the sleeve 81 is formed the gear 83 which is slightly larger than the gear 80. The gear 83 in turn meshes with the idler gear 84 journaled on the stud 85 fixed in the ring member 57. The idler gear 84 meshes with the rotatable internal gear 86 formed in the bearing bore of the internal gear ring 61.

The graduated dial 48 rotates directly with the rotation of the cross feed screw. In this particular embodiment, the screw 17 and nut 16 are so arranged that one complete revolution of the screw in a counter-clockwise direction moves the cross slide outwardly .250" relative to the work spindle axis 87 to cause a .500" change or increase in the diameter of the work piece. The graduated collar 48 has its graduations 53 arranged in increasing amount from zero to .500" for one complete revolution of the screw in a counter-clockwise direction of withdrawal of the tool from the work axis, the series of numerals giving this indication being the series indicated at 88. As the screw is rotated a second revolution to effect a complete change of 1.000" in work diameter, a second series of reference numerals 89 formed on the collar are utilized. These numerals begin at the .500" line and continue to the 1.000" line. Thus for all changes in work diameter up to 1.000", the front indicating dial or collar 48 gives the operator a direct reading of the setting of the cutting tool.

The planetary gearing 78—76, 77—80, and 83—84—86 between the front dial 48 and the rear dial 66 is so arranged that for one revolution of the screw the dial 66 moves from the zero line 89 to bring the .5" line 90 opposite the zero setting line 74 and then a second complete revolution of the dial brings the 1" line 91 opposite the zero setting line 74. Thus the operator is given a direct reading telling him whether he has moved between zero and .500" so he will read the series of reference numerals 88 or whether he is in the .500" to 1.000" range so he can read the series of numerals 89. Further, the graduations on the dial 66 continue on in increasing amounts showing the cumulative change in work diameter effected throughout the entire distance of travel of the cross slide. At all times the graduations on the dial 66 show which of the scales or series of numerals 88 or 89 to read and the total inches moved from the zero setting at the beginning of a series of successive stepped diameter cuts undertaken. In other words, whenever the zero setting line 74 appears between the main graduations 89a—90, 91—92, etc., the operator reads the series of numerals 88 on the dial 48 to get the exact "thousandths" of the setting, and whenever the zero setting line 74 appears between the lines 90—91, 92—93, etc., the operator uses the series of numerals 89 to obtain his exact setting.

There has thus been provided a completely direct reading indicating dial mechanism for a lathe cross feed mechanism which eliminates all mental effort and skill required in setting the cross slide to effect a series of different diameter cuts. The operator is relieved of all uncertainty of remembering the correct number of revolutions of the cross feed dial, especially in ranges of diameter change greater than one inch. The arrangement is further provided with means whereby either or both of the graduated collars may be readily set to any desired zero starting point.

Having thus fully set forth and described this invention, what is claimed and desired to be secured by United States Letters Patent is:

1. In a dial indicating mechanism for a lathe having, a carriage, a cross slide, and a cross feed screw rotatably mounted against axial movement on said carriage for actuating said cross slide, a hand wheel fixed to said cross feed screw, an indicating dial fixed to rotate with said hand wheel and cross feed screw, a second indicating dial rotatably journaled on said carriage, and planetary gearing interconnecting said dials including a stationary gear fixed to said carriage, a planetary gear engaging said stationary gear and journaled on said first mentioned indicating dial, an internal gear on said second indicating dial, and gearing actuated from said planetary gear engaging said internal gear, a series of "thousandths" graduations fixed on said first mentioned dial, two series of fixed indicating numerals associated with said "thousandths" graduations, a single series of "inches" graduations and numerals fixed on said second mentioned indicating dial, and a member fixed to said carriage and located intermediate said dials having a zero indication thereon associated with both of said sets of graduations whereby the position of the graduations on said second dial relative to said zero indication shows which series of numerals is in effect on said first mentioned dial.

2. In a dial indicating mechanism for a lathe having a carriage, a cross feed screw journaled in said carriage, and a hand wheel fixed on said screw, a plate member fixed to rotate with said screw, a "thousandths" indicating dial journaled on said plate, disengageable clutch means between said plate and said "thousandths" dial, means for yieldingly urging said clutch means in engagement, an internal gear ring member journaled on said carriage, a second "inches" indicating dial journaled on said ring member, a second disengageable clutch means between said ring member and said second dial, means for yieldingly urging said second clutch means in engagement, a member fixed on said carriage and located between said dials having zero setting markings associated with graduations on said dials, hand gripping means on each of said dials for independent manual adjustment of each of the dial graduations relative to each other and to said zero setting markings and independent of said clutch means to move said rotation of the cross feed screw, and differential gearing interconnected between said dials for the slower rotation of said second dial relative to said first dial upon rotation of said cross feed screw.

3. In a cross feed dial indicating mechanism for a lathe having, a carriage, a cross slide on said carriage, a cross feed screw journaled against axial movement on said carriage for actuating said cross slide, and a hand wheel for rotating said screw, a first indicating dial journaled on said screw for limited axial movement, positive jaw clutch means between said first indicating dial and said screw, means for yieldingly moving said dial axially to engage said clutch means, and means on said dial for manually moving said dial axially in the opposite direction to disengage said clutch means and rotating said dial relative to said screw, a second indicating dial journaled for limited axial movement on said carriage, positive jaw clutch means between said second indicating dial and a planetary gear drive interconnecting said second dial with said screw and carriage, means for yieldingly moving said second dial axially, in the opposite direction from the yielding movement of said first dial, to engage said second mentioned clutch means, and means on said second dial for manually moving said second dial axially in the opposite direction for disengaging said second clutch means and rotating said second dial independently of said first dial and said planetary gearing, and a common zero setting line carrying means fixed on said carriage and located between said dials.

4. In a cross feed dial indicating mechanism for a lathe having, a carriage, a cross slide on said carriage, a cross feed screw journaled against axial movement on said carriage for actuating said cross slide, and a hand wheel for rotating said screw, a first indicating dial journaled on said screw for limited axial movement, positive jaw clutch means between said first indicating dial and said screw, means for yieldingly urging said dial axially to engage said clutch means, and means on said dial for manually moving said dial axially in the opposite direction to disengage said clutch means and rotating said dial relative to said screw, a second indicating dial journaled for limited axial movement on said carriage, positive jaw clutch means between said second indicating dial and a planetary gear drive interconnecting said second dial with said screw and carriage, means for yieldingly urging said second dial axially, in the opposite direction from the yielding movement of said first dial, to engage said second mentioned clutch means, and means on said second dial for manually moving said second dial axially in the opposite direction for disengaging said clutch means and rotating said second dial independent of said first dial and said planetary gearing, and a common zero setting line carrying means fixed on said carriage and located between said dials, "thousandths" graduations on said first dial indicatively related to said zero setting line, two series of numerals fixed on said first dial indicatively related to said "thousandths" graduations, and "inches" graduations and a single series of numerals fixed on said second dial indicatively related to said zero setting line whereby the position of graduations of said second dial with respect to said zero setting line carrying means determines which series of numerals on the first dial are in effect to show the setting of the cross slide.

5. In a lathe having a carriage, a cross feed dial indicating mechanism, a first dial rotating directly with the cross feed screw of the lathe, graduations fixed on said first dial indicating in "thousandths" the diameter change for a work piece in the lathe, two series of indicating numerals fixed on said first dial associated with said graduations, one series reading from 0" to .500" for one complete revolution of the cross feed screw and the second series reading from .500" to 1.000" for a second complete revolution of said screw, a second dial differentially driven at a slower rate than said first dial upon rotation of said screw, graduations on said second dial indicating in "inches" the diameter change for a work piece in said lathe, a single series of indicating numerals on said second dial associated with said graduations reading from 0" to the complete travel of the lathe cross slide in one complete revolution of said second dial, a fixed member located between said dials having zero setting line indicating means thereon indicatively associated with the graduations on both of said dials, and clutch means interconnecting said first dial with said screw and said second dial with the carriage operable for independently adjusting and positioning each of said dials relative to each other and to said cross feed screw to set any desired graduations of said dials in position with said zero setting line indicating means.

GEORGE W. LUNING.

REFERENCES CITED

The following references are of record in the file of this patent:

UNITED STATES PATENTS

| Number | Name | Date |
|---|---|---|
| 1,263,142 | Stubbs | Apr. 16, 1918 |
| 1,850,640 | Sperry | Mar. 22, 1932 |
| 2,450,788 | Foster | Oct. 5, 1948 |